United States Patent Office 3,246,933
Patented Apr. 19, 1966

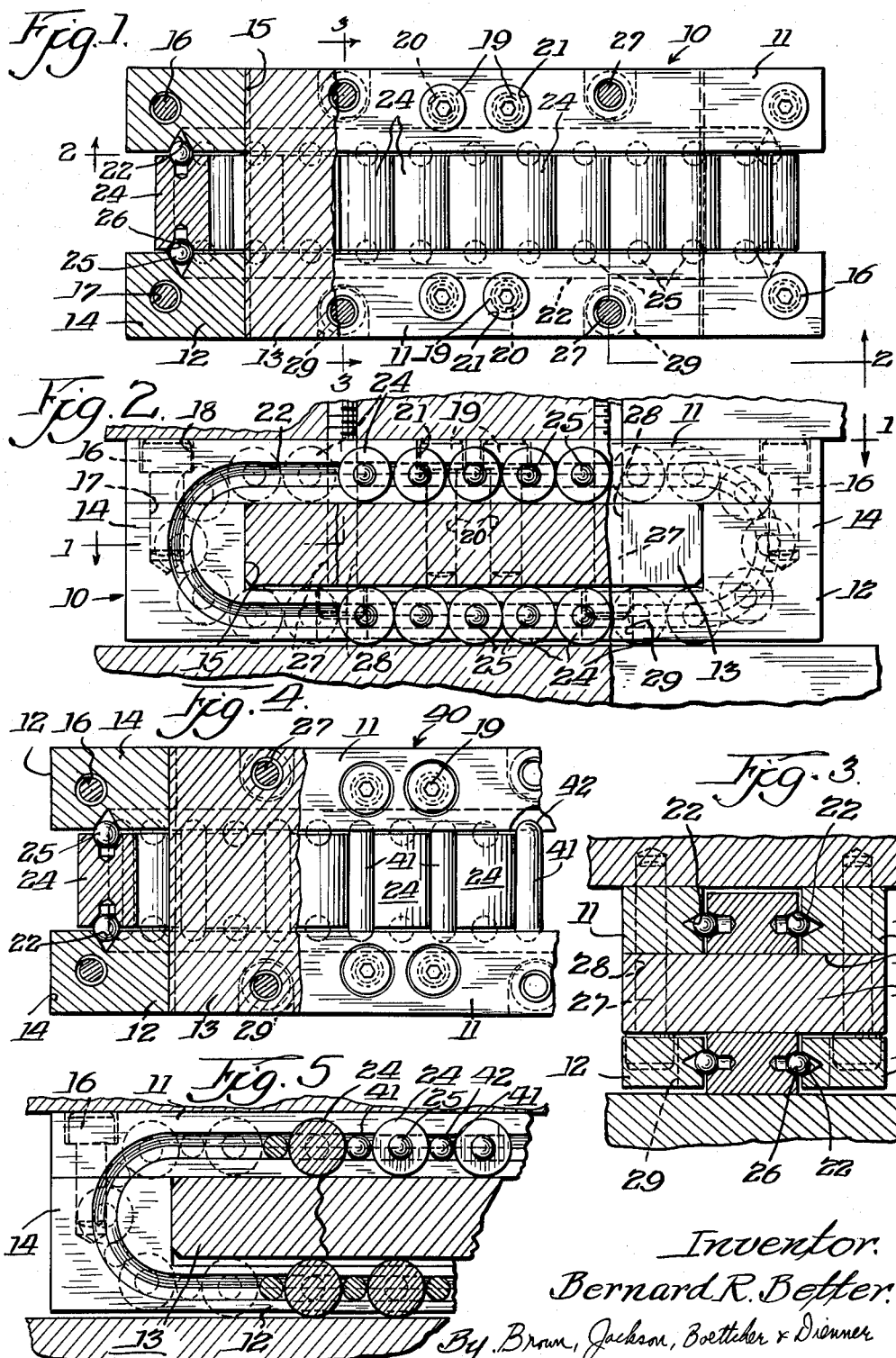

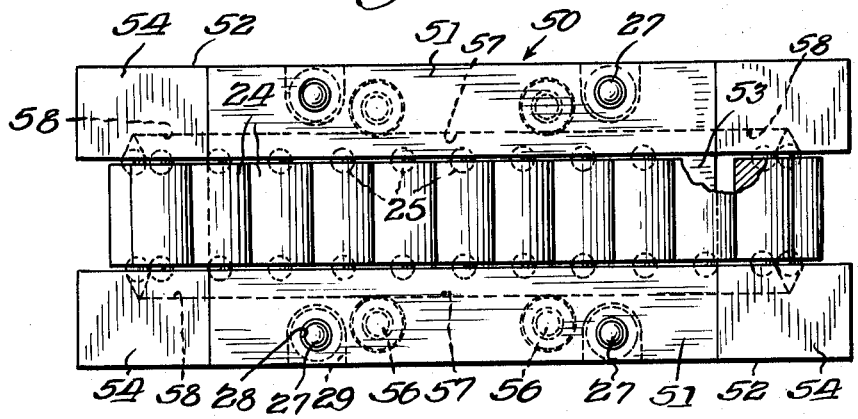
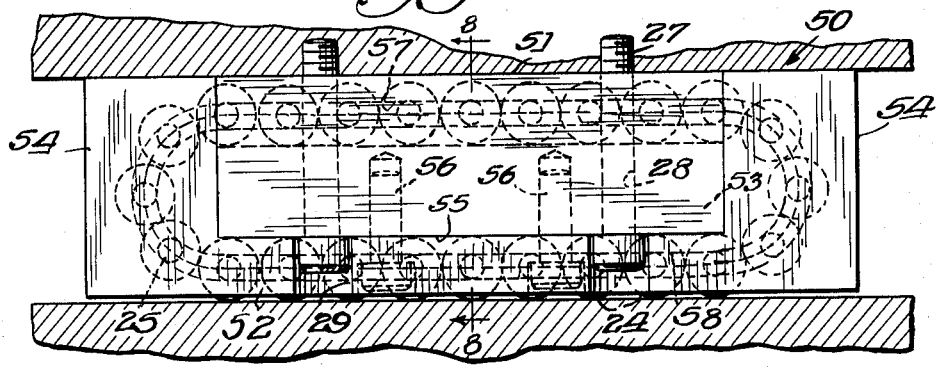
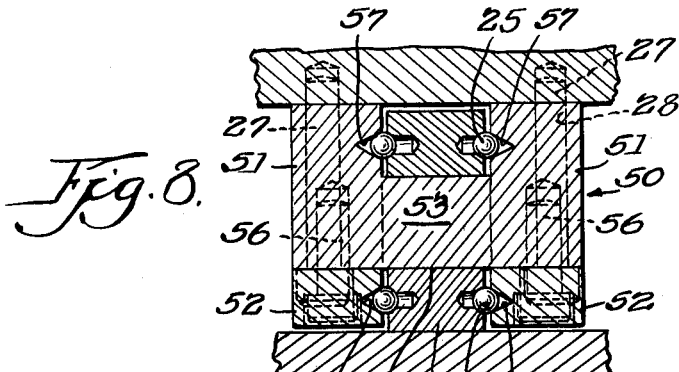

3,246,933
WAY BEARING
Bernard R. Better, Chicago, Ill., assignor to Scully-Jones and Company, Chicago, Ill., a corporation of Illinois
Filed May 8, 1963, Ser. No. 278,883
13 Claims. (Cl. 308—6)

The present invention relates to way bearings, and more particularly to recirculating roller bearing constructions for use on the ways of machines and the like, and in similar applications.

Recirculating roller bearings are commonly used as way bearings in large machines having heavy parts reciprocably movable along ways, or machines in which large or heavy parts reciprocate relative to each other. Since a plurality of such bearings are required in use, it is important that they be precisely the same dimensions, particularly in the direction extending between the relatively movable parts. Otherwise, the load on the several bearings will not be evenly distributed, and the parts will not be properly positioned and aligned, so that excessive wear and interference with proper operation will result. It is also important that friction and wear in the bearing construction itself be reduced to a minimum, so as to assure long life and smooth operation and consequent free and smooth movement of the relatively movable parts.

It is accordingly an important object of the present invention to provide a roller bearing construction providing for very easy, smooth, and friction-free journaling and guiding of the bearing rollers.

Another object is the provision of a way bearing construction which lends itself to precise control particularly of the critical dimension in the direction of the application of load.

It is another object to provide a recirculating roller bearing construction in which the bearing rollers are guidedly engaged with a track by trunnions rotatable both along the track and in the rollers to afford maximum freedom from friction.

A further object is the provision of a roller bearing construction in which friction between bearing rollers having trunions engaged in guide tracks is reduced by auxiliary rollers of the trunnion diameter also guided in the tracks.

Other and further objects, advantages, and features of the invention will be apparent to those skilled in the art from the following detailed description, taken in conjunction with the accompanying drawings, in which:

FIG. 1 is a view partly in plan and partly in horizontal section, substantially as indicated by the line 1—1 in FIG. 2 of one embodiment of the invention;

FIG. 2 is a view partly in side elevation and partly in vertical section, substantially as indicated by the line 2—2 of FIG. 1;

FIG. 3 is a cross-sectional view taken substantially as indicated by the line 3—3 of FIG. 1;

FIG. 4 is a fragmentary view similar to FIG. 1, but showing another embodiment of the invention;

FIG. 5 is a view similar to FIG. 2, but showing the embodiment of FIG. 4;

FIG. 6 is a plan view of another bearing construction according to the invention;

FIG. 7 is a side view of the bearing of FIG. 6; and

FIG. 8 is a cross-sectional view taken substantially as indicated by the line 7—7 in FIG. 7.

Referring first to FIGS. 1 to 3 inclusive, there is shown a recirculating roller bearing structure generally designated 10, comprising a bearing block generally H-shaped in section, as best shown in FIG. 3, formed with a pair of parallel walls each provided by two elements 11 and 12, and a race block 13 extending transversely between and connecting the walls. In the drawings, the bearing 10 is illustrated with the walls vertical and the race block horizontal, the wall elements 11 extending over the elements 12, and thus for convenience in description being referred to as the upper wall elements, the wall elements 12 being similarly designated the lower elements. The upper wall elements 11 are of uniform rectangular section throughout their length, while the lower elements 12 are of elongated U-shape, having an elongated central portion and integral spacing projections 14 at the ends thereof extending into engagement with the respective upper wall elements 11. As evident particularly from FIGS. 2 and 3, each wall is provided with a central aperture 15 defined by the upper and lower elements and the projections 14. The elements 11 and 12 are secured together to provide the wall as by screws or bolts 16 extending through bores 17 in the elements 11 and projections 14, with the heads received in counterbores 18 in the elements 11. The race block 13 has a width greater than the combined thickness of the walls, and is of a length such as to fit between the projections 14. Its thickness is not greater, and preferably slightly less, than the height of the projections, as shown in FIGS. 2 and 3. The block 13 is secured to the upper wall elements 11 as by means of screws 19 extending in bores 20 in the parts with counterbores 21 in the wall elements. By proper selection of the length of the screws and reception of the heads in the counterbores, the screws are disposed within the opposite surfaces of the assembled block and upper elements. It will be evident that upon securement of the race block 13 to the elements 11, and of the elements 11 to the spacing projections 14 of the lower elements 12, the bearing block has the H-shaped cross section of FIG. 3.

Before complete assembly of the bearing block, however, the rack block 13 is secured to the upper elements 11 in the relation it is to have when assembled. This may be done by any suitable means, as for example by the screws 19 or by clamping means. The upper faces of the elements 11 and the lower face of the race block 13 are then ground or otherwise given a smooth finish, and the distance between them brought to a predetermined dimension. The grinding of these surfaces with the race block and elements 11 held together as a unit in the assembled relation allows precise control of the spacing between the upper and lower faces of the subassembly, as well as of the finish of the faces. Aligned bores in the elements 11 and block 13 may be provided to receive dowels for locating the parts properly, in a well-known manner.

The race block and elements 11 are then separated, and the pair of elements 11 and 12 for each wall are disposed in their aperture-defining relation, and an endless groove 22 of V-section or other tapering section is milled or otherwise suitably formed in the inner face of the wall defined by the two elements. The groove surrounds the aperture 15 and has portions extending parallel to the long sides of the aperture, or in other words to the opposed surfaces of the elements 11 and 12. The ends of these straight portions of the groove 22 are connected by arcuately curved end portions each extending across the joint between the two elements, and preferably spaced considerably from the ends of the aperture 15. The elements may be secured in the assembled relation for forming of the groove therein by any suitable means, as by appropriate clamps, or by the screws 16. In any case, the two elements may be brought into the precise position desired by means of dowels driven into bores extending through the upper member 11 and the spacing projections 14 of the lower member. After the grooves have been formed, the elements are separated preparatory to assembly of the entire bearing structure as already described.

A suitable number of bearing rollers 24 is employed in the bearing, each roller having trunnions in the form of anti-friction balls 25 engaging in the grooves 22 of the opposed walls, so as to be guided about the race block 13. The rollers 24 have a radius equal to the spacing between the center lines of the grooves from the lower surface of the race block, so as to be engageable with this surface throughout its length in load-transmitting relation, the surface constituting a loading zone or surface for the bearing. The rollers also engage on the opposite surface of the race block, but it is not important that they do so, since this is merely a return or transfer surface. The rollers 24 pass about the ends of the race block without riding thereon, although this is not necessary to the invention. The balls 25 are of a diameter such as to engage in the grooves 22 but to extend thereinto for a distance less than their radius, as best shown in FIG. 3. Each ball is also partially received in an axial recess 26 in the end of the roller 24, which as shown is of conical shape at least at the outer portion thereof. The dimensions of the ball and recess are so related that a major portion of the ball engages in the recess, and holds the end of the roller slightly spaced from the adjacent wall surface so as to provide clearance therebetween. The wall elements 11 have a height greater than the diameter of the bearing rollers 24, while the spacing of the lower faces of the lower elements 12 from the load surface of the race block is less than the roller diameter. The rollers when engaged on the load surface extend radially out of the channel defined by the race block and wall elements 12, but when engaged on the opposite surface of the block 13 are completely within the channel provided by the block and the upper wall elements 11. The bearing 10 may be mounted on one of two reciprocable or otherwise relatively movable parts by means of screws 27 or the like extending through bores 28 formed in the upper and lower wall elements and race block, and engaging with the part to which the bearing is fastened. Recesses 29 in the lower wall elements 12 accommodate the heads of the screws 27.

In assembling the parts of the bearing 10, the race block 13 is secured to one of the upper wall elements 11, to which one of the lower elements 12 is then also secured, and this subassembly is disposed with the wall horizontal, grooved side up. The rollers 24 are disposed vertically with the antifriction balls 25 at the lower ends engaged in the groove 22. The other wall, provided by securing the elements 11 and 12 together by the screws 16, may then be moved downwardly to receive the longitudinal marginal portion of the race block 13 in the aperture 15 and the balls 25 at the upper ends of the rollers in the groove 22. When the portions of the bores 28 in the element 11 and block 13 come into registration, the screws 19 are inserted to secure these parts together, thus completing the assembly of the bearing.

It will be evident that the diameter of the rollers 24 can be controlled very closely in manufacture in known manner. The distance between the load surface of the race block and the plane of the upper surfaces of the wall elements 11 also may be precisely determined by reason of the disclosed construction as explained hereinabove. The overall dimension of the bearing between the relatively movable parts separated thereby, or what may be called the height, therefore may be held to very close limits. All of the bearings employed as way bearings or the like between relatively moveable parts of a machine thus have the same height, resulting in uniform load distribution, assuring relative movement without binding, and maintaining proper alignment or positioning of the parts with other parts of the machine.

The journaling of the rollers 24 by means of trunnion balls 25 rotatably engaged in both the guide grooves 22 and the ends of the rollers provides a very free-rolling construction greatly reducing friction and allowing smooth bearing movement, augmented by the slight spacing of the rollers from the inner faces of the walls. Friction between the rollers and walls is thus eliminated, except as the rollers may occasionally become skewed or canted and thus have the end edges thereof engage the walls. By properly proportioning the length of the rollers to the diameter and holding the clearance between the rollers and walls to a low value, the maximum angle of skew permitted the rollers may be so small that side thrust is almost eliminated and no wedging or jamming of the rollers can occur. By reason of the use of the trunnion balls 25, there is very little wear on the parts.

In any event, a slight increase in the aforesaid clearance, or some looseness, particularly transversely of the groove, does not detract appreciably from the efficient operation of the bearing, the rollers nevertheless being retained in operative relation by the trunnion balls. The rollers need not even engage on the upper or transfer surface of the race block, and are of course held against the load surface when they move between it and the way W or similar surface, so that greater movement allowed the rollers in the indicated direction does not interfere with their operation.

It will be appreciated that the recesses 26 in the ends of the rollers 24 need not be of the inner cylindrical and outer conical shape shown, but may have any desired form for partially receiving the balls 25 with sufficiently little contact to minimize friction and wear. Similarly, the cross-sectional shape of the grooves 22 may vary from the angular form illustrated, so long as the balls may be properly accommodated without any great friction.

In FIGS. 4 and 5, there is illustrated another way or recirculating roller bearing, generally indicated as 40, which is substantially the same as the bearing 10 except for the use of idler or auxiliary rollers 41 disposed alternately with the bearing rollers 24, so that a roller 41 lies between each pair of adjacent rollers 24, as clearly shown in the figures. The rollers 41 are of the same diameter as the trunnion balls 25, and have the ends thereof of hemispherically rounded form, as shown at 42, so as to correspond to half of a ball 25. The length of the auxiliary rollers is substantially the same as the overall length of the bearing rollers 24 including the two balls 25 engaged in the end recesses as described; thus the rounded ends of the idler rollers engage in the grooves 22 in substantially the same manner as the balls 25, so that they may travel freely along the grooves and rotate therein without any great friction. The idler rollers 41 further reduce the friction in the bearing, as is known, by eliminating the opposed movements of engaging rollers against each other when both are rotating in the same direction, each idler being rotated in the opposite direction by the action of both bearing rollers on diametrically opposite portions thereof. Since the rollers 41 do not engage the race block 13, and rotate easily in the grooves 22, they are under no appreciable load which might interfere with their friction-reducing operation or free travel along the grooves.

While the rollers 41 might be made of greater diameter and provided with reduced ends to engage in the guide grooves, the formation thereof as disclosed has the advantages that round or roller stock of the proper diameter may be employed without requiring any grinding or other machining or forming operations than imparting the rounded shape to the ends of appropriate lengths of such stock. At the same time, the use of idler rollers of the same diameter as the trunnion balls assures proper fit of the rounded ends in the grooves, and avoids having to exercise care and expend time and labor in reducing the ends of larger-diameter rollers to the desired dimension.

In FIGS. 6 to 8 inclusive, there is illustrated a further form of the bearing, generally designated as 50, differing from the bearings of FIGS. 1 and 4 primarily in the construction of the bearing block. The block is of general H-shape in cross section, as best evident from FIG. 8, defined by a pair of parallel walls each formed by two wall elements 51 and 52, and a race portion 53 extending between the walls and integral with the elements 51. It will be evident that the wall elements 51 and race portion 53 provide a channel structure constituting a distinct unit. The wall elements 52 are of greater length than the elements 51 and race portion 53, and of elongated U-shape with projections 54 adjacent the ends thereof. The projections 54 of each wall element 52 are spaced apart by a distance corresponding to the length of the channel structure, or in other words the lengths of the wall elements 51 and race portion 53, so as to receive one of the wall elements 51 therebetween in aligned relation upon assembly of the bearing. A slight clearance may be provided between the ends of the channel structure, and the projections 54, and a similar clearance may be employed between the outer bottom surface 55 of the channel structure, or in other words the surface of the race portion 53 directed away from the edge faces of the wall elements 51, and the adjacent faces of the members 52 which define the bottom of the recesses into which the channel structure is fitted. Screws 56 or like members may extend through suitable aligned bores in the wall elements 52 and 51 to threadedly secure the elements 52 and channel structure together in assembled relation. In this assembled relation, it will be apparent that the race portion 53 and the wall elements 52 define a channel formation, as shown in FIG. 8. The outer bottom surface 55 of the channel structure is flat, and preferably smooth, and constitutes a load surface for the bearing. The inner bottom of the channel structure, or the face of the race portion 53 opposite the load surface 55, need not be similarly flat and smooth.

Roller guide grooves are provided in the opposed inner faces of the parallel walls of the bearing block, these endless grooves each having a portion 57 in one of the wall elements 51 substantially parallel to the inner bottom surface of the channel structure. The remaining and major portion 58 of each groove is formed in the inner face of the wall member 52 and its projections 54, having an intermediate rectilinear portion extending in close parallelism with the plane of the load surface 55, and curved portions each extending in an arc or other smooth curve from each end of the intermediate portion so as to connect with the corresponding or adjacent end of the groove portion 57 in the associated wall portion 51. It will be evident that the endless grooves formed by the groove portions 57 and 58 are substantially similar to the endless grooves 22 previously described, and as shown in FIG. 8, may have the V-section of those grooves, or other suitable cross section.

A plurality of rollers 24 is employed in the bearing, as in the case of the bearings 10 and 40 of FIGS. 1 and 4, each bearing having the ball trunnions 25 engaged in axial recesses 26 of the rollers and guidedly engaged in the grooves provided by the groove portions 57 and 58, the rollers engaging on the load surface 55 of the race portion 53 and projecting radially outwardly of the channel formation defined by the load surface and the wall elements 52, so that they may engage upon the surface of one of two relatively movable parts, the depth of the channel formation being less than the diameter of the rollers. The depth of the channel structure is greater than the diameter of the rollers, as evident from the drawings, the channel structure providing a return or transfer for the rollers. It will be apparent that the portions 57 of the guide grooves may be spaced from the inner channel bottom by more than the radius of the roller, if desired, and that the formation thereof need not be as precise as that of the groove portions 58. The bearing 50 is mounted on the relatively movable part spaced from the part on which engage the rollers 24 by the screws 27 extending through bores 28 with the enlarged head-accommodating recesses 29 substantially as in the case of the bearings 10 and 40, the edge faces of the wall elements 51 directed away from the load surface 55 engaging against the part on which the bearing is mounted. This is clearly shown in FIG. 8.

It will be evident that the operation of the bearing construction 50 is substantially the same as in the case of the bearings 10 and 40, and that if desired the auxiliary rollers 41 may be provided between the rollers 24, as in the case of the bearing 40 illustrated in FIGS. 4 and 5. The load is transmitted from the rollers 24 engaging on one of the relatively movable parts, through the load surface 55 and race portion 53 to the wall elements 51, and thus to the other of the relatively movable parts. Of course, the transmission of load may be in the opposite direction, although through the same elements or parts.

The bearing construction disclosed in FIGS. 6 to 8 facilitates the provision of the precise dimensioning of the bearing in the direction in which load is transmitted, substantially as in the case of the construction of FIGS. 1 to 3. The channel stucture provided by the integral race portion 53 and wall elements 51 allows of ready machining of the outer bottom or load surface 55 of the channel structure and the oppositely directed edge faces of the wall elements 51. The desired parallel relationship and the precise spacing therebetween thus may readily be achieved, since the load surface 55 and the oppositely directed edge faces of the wall elements 51 are readily accessible, and may be operated upon either simultaneously or successively as may be most convenient or desirable. The distance between the plane of the edge faces of the elements 51 and the plane of the load surface 55 accordingly may readily be controlled within close predetermined limits, and since the diameter of the rollers 24 may also be readily controlled by known means, the overall dimension of the bearing construction in the direction of transmittal of load is readily held within the desired limits. The projections 54 of the wall elements 52 may have a dimension in this direction such as to terminate short of the plane of the faces of the elements 51, if desired, so as not to engage to part on which the bearing is mounted.

By reason of the clearance provided between the outer bottom face of the race portion 53 of the channel structure and the adjacent surfaces of the wall elements 52, these surfaces of the wall elements need not be precisely finished, and since the wall elements 52 do not carry or transmit any of the load, the dimensions thereof are not critical and need not be precisely controlled, particularly in the direction of load transmission. If desired, however, the load surface 55 of the channel structure may engage closely or seat on the wall elements 52. In such case, the surfaces of the elements between the respective projections 54 thereof may be readily machined to fit closely against the load surface 55, by reason of the accessibility of all faces of the elements 52. Whether the channel structure is seated on these surfaces of the wall elements 52 or not, the spacing of the rectilinear intermediate sections of the guide groove portions 58 from the load surface 55 is maintained within close limits, so as to assure load-transmitting engagement of the rollers 24 on the load surface 55.

The guide groove portions 58 in the inner faces of the wall elements 52, including the projections 54, may readily be formed, since such faces of the elements are readily accessible for milling, or other machining operations for forming the grooves, and similarly is readily disposable in such fashion that the location or path of the groove portions 58 is easily and exactly controllable. The groove portions 57 in the inner faces of the wall elements 51 of the channel structure referred to are not as readily formed or controlled, since by reason of the channel construction the inner faces of the elements 51 are not quite as accessible as the faces of the wall elements 52. It will be appreciated, however, that since the channel structure is a return or transfer means for the rollers 24, the location of the grooves and the surface smoothness thereof are not particularly important. The rollers in this portion of the bearing do not even need to engage on the inner bottom surface of the channel structure, since there is no load carried by the rollers at this location, and accordingly the groove portions 57 may be spaced from the inner channel structure bottom by slightly more than the radius of the rollers, to assure that they will not bind in moving through the channel structure, and thus avoid any difficulty which might arise by reason of the limitation of access to the inner faces of the wall elements 51.

It will be evident that the roller bearing construction 50, like the bearings 10 and 40, provides an efficient antifriction recirculating bearing well adapted for use as a way bearing or in similar applications, and by reason of its construction facilitates and lends itself to ready fabrication of the parts and easy control of precisely limited dimensions. The bearing block requires only three parts, which may readily be assembled and secured together in forming the complete bearing structure, and thus further facilitates the provision of an efficient, precise bearing construction at relatively low cost.

It will be understood that while what are regarded as preferred embodiments of the invention have been illustrated and described herein, these are exemplary, and numerous modifications and variations thereof may be made without departing from the essence of the invention.

I claim:

1. A roller bearing construction comprising a bearing block including a race portion having a flat load surface, a pair of substantially parallel wall portions at opposite sides of said race portion having opposed inner faces normal to said load surface and extending outwardly relative to the race portion, an endless groove in each of said inner wall portion faces having a straight portion parallel to the load surface and another portion extending parallel to the opposite surface of the race portion and also having curved portions extending about the opposite ends of the race portion and connecting the ends of said straight portion and other portion of the groove, said grooves being in coincident relation transversely of said block, a plurality of bearing rollers disposed transversely between the wall portions in substantially parallel relation to each other and each having a radius corresponding to the spacing of said straight groove portions from the flat load surface, an axial recess in each end of each roller and a ball partially received in each said recess and guidedly engaging in the adjacent groove, the extent of said wall portions outwardly relative to said flat load surface of the race portion in the direction normal thereto being less than the roller diameter and the extent of the wall portions outwardly of said opposite surface being greater than the roller diameter.

2. A roller bearing construction as defined in claim 1, wherein an auxliary roller is disposed between each pair of adjacent bearing rollers, each of said auxiliary rollers having a diameter corresponding to that of said balls and a length greater than that of the bearing rollers and also having substantially hemispherical ends engaging in the opposed grooves.

3. A roller bearing construction comprising a bearing block including a pair of substantially parallel side walls, a generally rectangular race portion having one major face thereof defining a flat loading surface and having another major face opposite said one face, said race portion extending between said walls with said loading surface substantially normal to the walls and in predeterminedly spaced relation to that edge of each wall more remote therefrom than from said other major face, an endless guide groove in the inner face of each side wall surrounding the race portion and having a straight portion paralleling said flat loading surface, and a plurality of bearing rollers disposed in parallel relation to each other extending transversely between the side walls and having a radius equal to the spacing of said straight groove portions from the loading surface, each of said rollers having trunnion means comprising a ball at each end of each roller engaging in the opposed grooves, said rollers each having an axial depression in each end partially receiving one of the trunnion balls therein, the spacing of said more remote side wall edges from said opposite face to the race block being greater than the diameter of the rollers and the spacing of the opposite wall edges from said loading surface being less than the roller diameter.

4. A roller bearing construction comprising a bearing block including a pair of substantially parallel side walls, a generally rectangular race portion having one major face thereof defining a flat loading surface and having another major face opposite said one face, said race portion extending between said walls with said loading surface substantially normal to the walls and in predeterminedly spaced relation to that edge of each wall more remote therefrom than from said other major face, an endless guide groove in the inner face of each side wall surrounding the race portion and having a straight portion paralleling said flat loading surface, and a plurality of bearing rollers disposed in parallel relation to each other extending transversely between the side walls and having a radius equal to the spacing of said straight groove portions from the loading surface, each of said rollers having trunnion means comprising a ball at each end of each roller engaging in the opposed grooves, said rollers each having an axial depression in each end partially receiving one of the trunnion balls therein, the spacing of said more remote side wall edges from said opposite face of the race block being greater than the diameter of the rollers and the spacing of the opposite wall edges from said loading surface being less than the roller diameter; and a plurality of auxiliary rollers disposed between the bearing rollers with end portions rotatably engaging in said grooves, said end portions corresponding to half of one of said balls.

5. A roller bearing construction comprising a pair of substantially parallel walls each defined by first and second elongated members each having a pair of parallel straight edge faces and by a pair of spacing means extending between and secured to said members, an elongated aperture defined in each wall by said first and second members and spacing means, a race block extending transversely of said walls having opposed marginal portions secured in said wall apertures, said block having a flat load surface facing away from the first members and a surface opposite said load surface engaging the adjacent edge faces of the first members, a pair of endless guide grooves in the opposed inner faces of the walls extending about the race block, and a plurality of parallel anti-friction bearing rollers extending transversely between the walls having trunnions guidedly engaged in said grooves, said rollers engaging on said flat load surface in movement about the block to transmit load to and from the block, said flat surface and opposite surface of the block and the walls defining channel portions for the rollers, the channel portion defined by the first wall members and opposite block surface having a minimum depth greater than the roller diameter and the channel portion defined by the flat block surface and the second wall members having a maximum depth less than the roller diameter, the diameter of the rollers and the spacing between the flat load surface and the remote edge faces of the first members being held within close predetermined limits.

6. A bearing construction as defined in claim 5, in which said spacing means are integral with the respective second members.

7. A bearing construction substantially as defined in claim 5, in which each of said roller trunnions comprises an axial recess in one end of the roller and a ball rotatably engaged partially in said recess.

8. A bearing construction as defined in claim 7, wherein auxiliary rollers are disposed between the bearing rollers, each auxiliary roller having a diameter substantially equal to that of said trunnion balls and rounded ends guidedly engaged in said grooves.

9. A roller bearing construction comprising a pair of substantially parallel block walls each defined by first and second elongated members, said first members defining side walls of a channel structure and said second members having longitudinally spaced projections receiving said first members in aligned relation therebetween, a flat race portion extending between said block walls integral with the first members and defining the bottom of said channel structure, the outer face of said bottom providing a load surface and being spaced within close predetermined limits from the plane of the edge faces of the channel structure side walls, a pair of endless guide grooves in the opposed inner faces of the first and second members extending about said race portion, and a plurality of anti-friction bearing rollers extending between said block walls and having trunnions guidedly engaged in said grooves, said rollers engaging on said load surface in movement about the race portion to transmit load to and from the race portion, the minimum depth of said channel structure being greater than the roller diameter, said second members and load surface defining a second channel structure having a maximum depth less than the roller diameter.

10. A bearing construction substantially as defined in claim 9, in which each of said roller trunnions comprises an axial recess in an end of the roller and a ball rotatably engaged partially in said recess.

11. A bearing construction as defined in claim 9, wherein auxiliary rollers are disposed between the bearing rollers, each auxiliary roller having a diameter substantially equal to that of said trunnion balls and also having rounded ends guidedly engaged in the grooves.

12. A roller bearing construction comprising a pair of substantially parallel block walls each defined by first and second members, said first members defining side walls of a channel structure included in said block walls and said second members having spaced projections receiving the first members in aligned relation therebetween, a race portion extending between said block walls defining the bottom of said channel structure and having the outer face thereof providing a flat load surface, a pair of endless guide grooves in the opposed inner faces of the block walls extending about the race portion in spaced relation thereto, a plurality of bearing rollers each extending transversely between the block walls and engaging on at least the load surface of the race portion, and trunnions on said rollers guidedly engaged in said grooves, the minimum depth of said channel structure being greater than the roller diameter, said second members and load surface defining a channel formation having a maximum depth less than the roller diameter, and the diameter of the rollers and the spacing between the load surface and the edges of the channel side walls being within close predetermined limits.

13. A bearing construction substantially as defined in claim 12, wherein said trunnions comprise each an axial depression in an end of a roller and a ball partially engaged in said depression.

References Cited by the Examiner

UNITED STATES PATENTS

| 1,286,289 | 12/1918 | Goldman | 308—217 X |
| 2,983,029 | 5/1961 | Perin | 29—148.4 |
| 3,003,828 | 10/1961 | Stark | 308—6 |
| 3,057,045 | 10/1962 | Johnson | 29—148.4 |
| 3,101,978 | 8/1963 | Stallman | 308—6 |

FOREIGN PATENTS 1,193,830  11/1959  France.

DON A. WAITE, *Primary Examiner.*

FRANK SUSKO, ROBERT C. RIORDON, *Examiners.*